US008804357B2

(12) United States Patent
Suzuki et al.

(10) Patent No.: US 8,804,357 B2
(45) Date of Patent: Aug. 12, 2014

(54) SLIDING-TYPE PORTABLE ELECTRONIC APPARATUS

(75) Inventors: Kengo Suzuki, Daito (JP); Norikazu Morioka, Daito (JP)

(73) Assignee: KYOCERA Corporation, Kyoto (JP)

( * ) Notice: Subject to any disclaimer, the term of this patent is extended or adjusted under 35 U.S.C. 154(b) by 267 days.

(21) Appl. No.: 13/387,471

(22) PCT Filed: Jul. 26, 2010

(86) PCT No.: PCT/JP2010/062515
§ 371 (c)(1),
(2), (4) Date: Jan. 27, 2012

(87) PCT Pub. No.: WO2011/013613
PCT Pub. Date: Feb. 3, 2011

(65) Prior Publication Data
US 2012/0120621 A1 May 17, 2012

(30) Foreign Application Priority Data

Jul. 29, 2009 (JP) ................................. 2009-176913

(51) Int. Cl.
*G06F 1/16* (2006.01)
(52) U.S. Cl.
USPC ........................ 361/760; 361/679.56; 361/752
(58) Field of Classification Search
None
See application file for complete search history.

(56) References Cited

U.S. PATENT DOCUMENTS

| 8,003,898 | B2 * | 8/2011 | Hayashi et al. | 174/385 |
|---|---|---|---|---|
| 8,531,844 | B2 * | 9/2013 | Nishiwaki | 361/752 |
| 8,554,291 | B2 * | 10/2013 | Takagi | 455/575.4 |
| 8,570,756 | B2 * | 10/2013 | Sakai et al. | 361/752 |
| 2007/0238494 | A1 * | 10/2007 | Pan | 455/575.4 |
| 2007/0270180 | A1 * | 11/2007 | Takagi | 455/550.1 |
| 2007/0275774 | A1 * | 11/2007 | Fagrenius et al. | 455/575.4 |
| 2009/0044206 | A1 * | 2/2009 | Onuma et al. | 720/601 |
| 2009/0067138 | A1 * | 3/2009 | Oliver et al. | 361/730 |
| 2010/0048264 | A1 * | 2/2010 | Sato et al. | 455/575.4 |
| 2011/0000712 | A1 * | 1/2011 | Kasuga et al. | 174/650 |

FOREIGN PATENT DOCUMENTS

| EP | 1 990 703 A1 | 11/2008 |
|---|---|---|
| JP | 2003-110675 A | 4/2003 |
| JP | 2006-157465 A | 6/2006 |
| JP | 2007-124384 A | 5/2007 |
| JP | 2009-088733 A | 4/2009 |
| WO | 2007/100023 A1 | 9/2007 |
| WO | 2009/041610 A1 | 4/2009 |

OTHER PUBLICATIONS

International Search Report dated Aug. 24, 2010, issued by the Japanese Patent Office for International Application No. PCT/JP2010/062515.

* cited by examiner

*Primary Examiner* — Anthony Q Edwards
(74) *Attorney, Agent, or Firm* — Procopio, Cory, Hargreaves & Savitch LLP

(57) ABSTRACT

A sliding-type portable electronic apparatus includes a pair of casings slidably coupled to each other, a flexible lead derived from one of the casings, is passed through an opening provided in the other casing and is connected to a circuit board incorporated in this other casing, and a waterproof sheet adapted to close the opening. The flexible lead passed through the opening is extended along a front surface of the circuit board and, thereafter, is folded back from the front surface toward a rear surface at a position on a side end surface of the circuit board, the flexible lead is connected, at its tip end portion, to the circuit board, on the rear surface, and the waterproof sheet is adhered, at its peripheral edge portions, to the flexible lead and to an inner surface of the other casing, at positions on a periphery of the opening.

9 Claims, 9 Drawing Sheets

F I G. 1
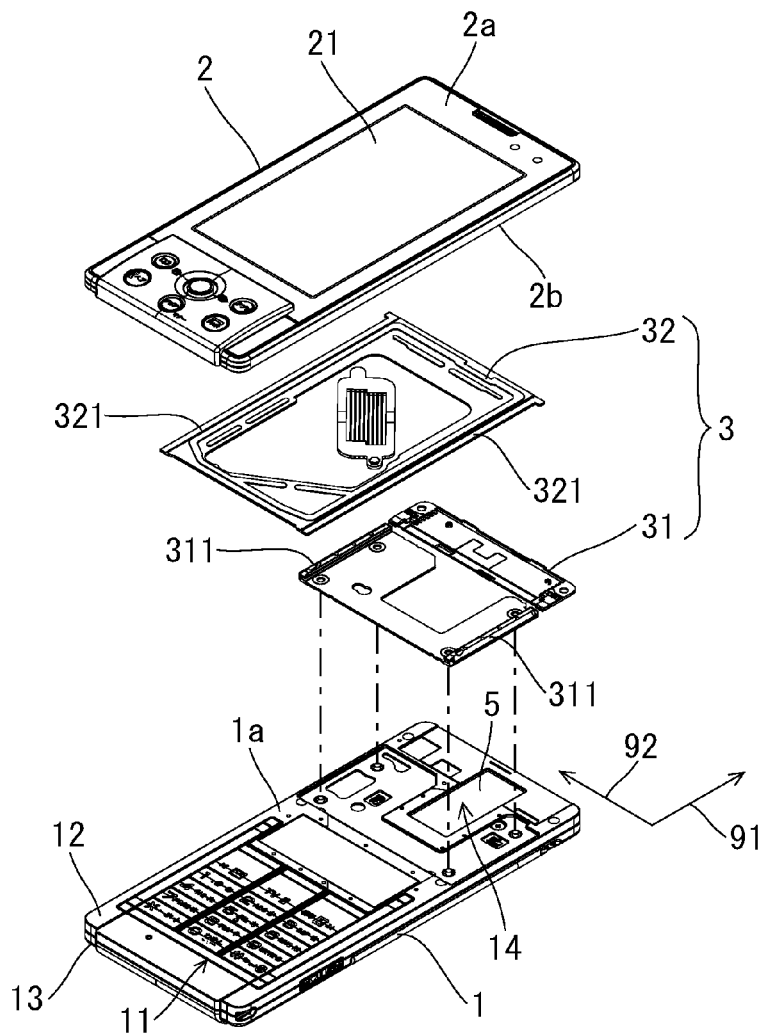
F I G. 2
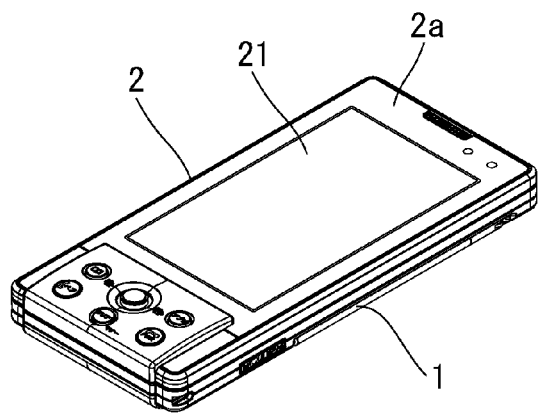

SLIDING-TYPE PORTABLE ELECTRONIC APPARATUS

TECHNICAL FIELD

The present invention relates to sliding-type portable electronic apparatuses comprising a pair of casings which are slidably coupled to each other.

BACKGROUND ART

In a sliding-type portable electronic apparatus of this type, a flexible lead is derived from an electric component incorporated in one of the casings, further, is passed through an opening provided in the other casing and, further, is connected to a circuit board incorporated in this other casing, and the opening is closed by a waterproof sheet from an inner surface of the other casing. In this case, a connector for connecting the flexible lead to the circuit board is installed on the surface of the circuit board which is closer to the opening.

In processing for assembling the sliding-type portable electronic apparatus, in a case where the circuit board is incorporated in the other casing, it is necessary to connect, at first, the flexible lead to the connector installed on the surface of the circuit board and, then, house the circuit board in the other casing.

In a conventional sliding-type portable electronic apparatus, a waterproof sheet is adhered, at only its base end portion, to an inner surface of the other casing, and the waterproof sheet can be bent at this base end portion, in order to turn up the waterproof sheet toward the inside of the other casing. Accordingly, in the processing for assembling such a sliding-type portable electronic apparatus, it is possible to derive the flexible lead through the opening, thereby making it easier to connect the flexible lead to the connector on the circuit board.

However, with such a conventional sliding-type portable electronic apparatus, the waterproof sheet has been adhered, at only its base end portion, to the other casing, which may cause intrusion of water thereinto, between the other casing and the waterproof sheet which are not adhered to each other.

If the waterproof sheet can be adhered to the other casing at its peripheral edge portions other than its base end portion, it is possible to prevent intrusion of water into the opening. However, in such a conventional sliding-type portable electronic apparatus, after the flexible lead has been connected to the circuit board, if the turned-up waterproof sheet is restored to the initial state, the circuit board comes closer to the other casing, which has made it impossible to adhere the waterproof sheet to the other casing, at its peripheral edge portions other than its base end portion.

Further, if the waterproof sheet is adhered at its entire peripheral edge portions to the other casing and to the flexible lead, before the flexible lead is connected to the circuit board, this will make it impossible to derive the flexible lead therefrom, thereby making it impossible to connect the flexible lead to the circuit board. This has induced a problem of difficulty of assembling the sliding-type portable electronic apparatus.

Therefore, it is an object of the present invention to provide a sliding-type portable electronic apparatus capable of exerting excellent waterproof performance with a waterproof sheet closing an opening through which a flexible lead passes.

SUMMARY OF THE INVENTION

A sliding-type portable electronic apparatus according to the present invention includes a pair of casings which are slidably coupled to each other, a flexible lead which is derived from an electric component incorporated in one of the casings, further, is passed through an opening provided in the other casing and is connected to a circuit board incorporated in this other casing, and a waterproof sheet adapted to close the opening. The flexible lead passed through the opening is extended along the front surface of the circuit board and, thereafter, is folded back from the front surface of the circuit board toward the rear surface thereof at a position on a side end surface of the circuit board. The flexible lead is connected, at its tip end portion, to the circuit board, on the rear surface of the circuit board, and the waterproof sheet is adhered, at its peripheral edge portions, to the flexible lead and to the inner surface of the other casing, at positions on the periphery of the opening.

BRIEF DESCRIPTION OF THE DRAWINGS

FIG. 1 is an exploded perspective view illustrating a sliding-type cellular phone according to an embodiment of the present invention.

FIG. 2 is a perspective view illustrating first and second cabinets constituting the sliding-type cellular phone at a close position.

DETAILED DESCRIPTION OF EMBODIMENTS

Figure 3:
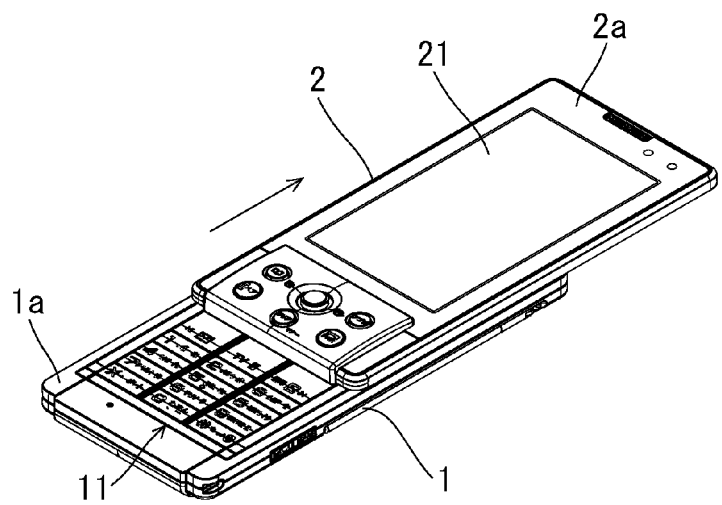
FIG. 3 is a perspective view illustrating the first and second cabinets at an open position.

Hereinafter, there will be described, in detail, an embodiment where the present invention is applied to a sliding-type cellular phone, with reference to the drawings.

FIG. 1 is an exploded perspective view illustrating a sliding-type cellular phone according to an embodiment of the present invention. As illustrated in FIG. 1, the sliding-type cellular phone is constituted by a first cabinet (1), a second cabinet (2), and a sliding mechanism (3) which couples the first and second cabinets to each other such that they can slide with respect to each other, wherein the first cabinet (1) is provided with an operation portion (11) in its front surface (1a), while the second cabinet (2) is provided with a liquid crystal display portion (21) in its front surface (2a).

In the sliding-type portable electronic apparatus, in general, the other casing is constituted by two case half bodies coupled to each other, and the opening is formed in one of these case half bodies. Further, in processing for assembling the sliding-type portable electronic apparatus, before the two case half bodies are coupled to each other, the flexible lead is passed through the opening formed in the one case half body, and the flexible lead passed through this opening is connected to the circuit board, and this circuit board is housed in the one case half body.

The sliding mechanism (3) is constituted by a guide portion (31) and a sliding portion (32), wherein the guide portion (31) is secured to the front surface (1a) of the first cabinet (1) in an area different from the area provided with the operation portion (11), and the sliding portion (32) is secured to the rear surface (2b) of the second cabinet (2).

The guide portion (31) is provided, at its opposite end positions, with a pair of left and right guide slots (311) (311), and the sliding portion (32) slidably engages, at its opposite end portions (321) (321), with the pair of left and right guide slots (311) (311), so that the direction of movements of the sliding portion (32) is defined to be in a longitudinal direction (91) of the first cabinet (1).

Accordingly, the first cabinet (1) and the second cabinet (2) can move with respect to each other, between a close position where both the cabinets (1) (2) are closed so that the operation portion (11) is covered with the second cabinet (2) as illustrated in FIG. 2, and an open position where both the cabinets (1) (2) are opened so that the operation portion (11) is exposed as illustrated in FIG. 3.

As illustrated in FIG. 1, the first cabinet (1) is constituted by a front-surface case half body (12) and a rear-surface case half body (13) which are coupled to each other. The front-surface case half body (12) is provided with an opening (14) for passing a flexible lead (4) therethrough (see FIG. 4), and this opening (14) is closed by a waterproof sheet (5) made of a PET (polyethylene terephthalate), on the inner surface of the first cabinet (1).

Figure 4:
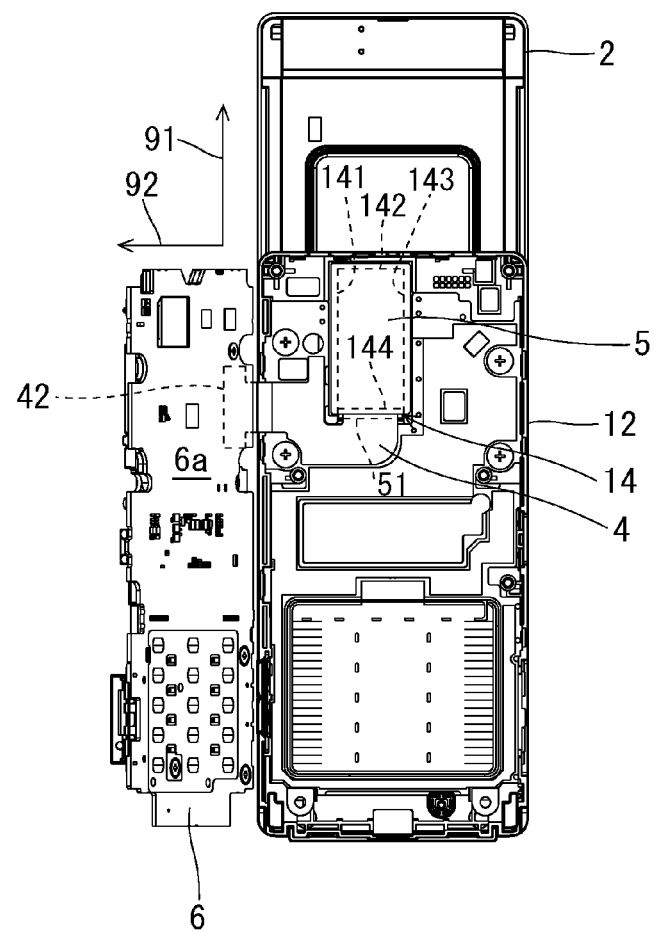
FIG. 4 is a plan view illustrating the internal structure of the first cabinet and also is a plan view illustrating an eighth process in a method for assembling the sliding-type cellular phone.

FIG. 4 is a plan view illustrating the internal structure of the first cabinet (1). As illustrated in FIG. 4, the opening (14) provided in the front-surface case half body (12) has a substantially-rectangular shape constituted by four sides (141) to (144), and the waterproof sheet (5) is adhered, at a portion of its peripheral edge portions, to the edge portions forming the three sides (141) to (143), out of these four sides (141) to (144). On the other hand, a peripheral edge portion of the waterproof sheet (5) is opposed to the edge portion forming the remaining single side (144), and a sponge member (51) is adhered to an opposing surface (144a) of this edge portion (see FIG. 5).

Figure 5:
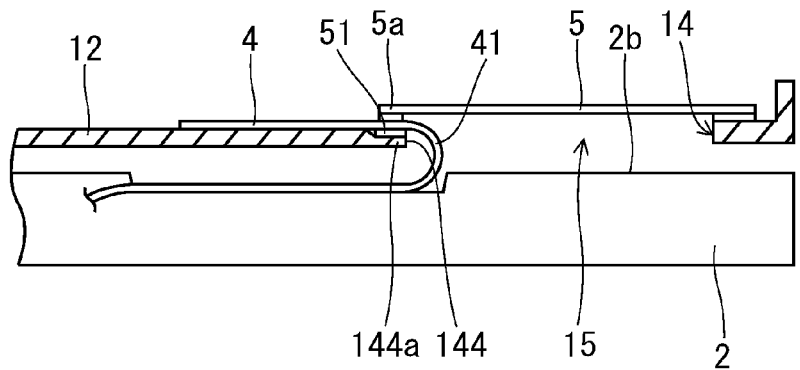
FIG. 5 is a longitudinal cross-sectional view illustrating a state of the wiring of a flexible lead, when the first and second cabinets are set at the close position.
Figure 6:
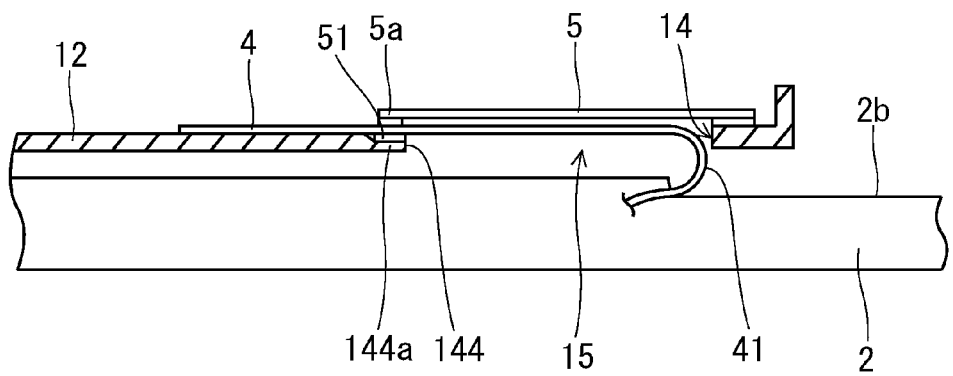
FIG. 6 is a longitudinal cross-sectional view illustrating a state of the wiring of the flexible lead, when the first and second cabinets are set at the open position.

FIG. 5 is a longitudinal cross-sectional view illustrating a state of the wiring of the flexible lead (4), when both the cabinets (1) (2) are set at the close position. FIG. 6 is a longitudinal cross-sectional view illustrating a state of the wiring of the flexible lead (4), when both the cabinets (1) (2) are set at the open position.

As illustrated in FIG. 5, the flexible lead (4) is connected to electrical components (not illustrated) which are incorporated in the second cabinet (2) and, also, the flexible lead (4) is derived therefrom through the rear surface (2b) of the second cabinet (2). The flexible lead (4) derived through this rear surface (2b) is extended along the rear surface (2b) of the second cabinet (2), thereafter, is bent in an U shape within a space (15) including the opening (14) provided in the front-surface case half body (12), and passes between the sponge member (51) and the waterproof sheet (5). Accordingly, the flexible lead (4) has its U-shaped bent portion (41), within the space (15).

Further, the waterproof sheet (5) is adhered to the flexible lead (4), at its opposing surface (5a) which is opposed to the edge portion forming the remaining single side (144). Further, in an assembled state, the sponge member (51) is pinched between the front-surface case half body (12) and the flexible lead (4).

The flexible lead (4) derived through the rear surface (2b) of the second cabinet (2) has a portion with a length which is maintained constant, up to a position passing through the opening (14). Accordingly, as illustrated in FIG. 6, when both the cabinets (1) (2) are slid with respect to each other from the close position to the open position, the bent portion (41) of the flexible lead (4) moves in the direction of sliding within the space (15), thereby allowing the first cabinet (1) and the second cabinet (2) to separate from each other in the direction of sliding.

Figure 7:
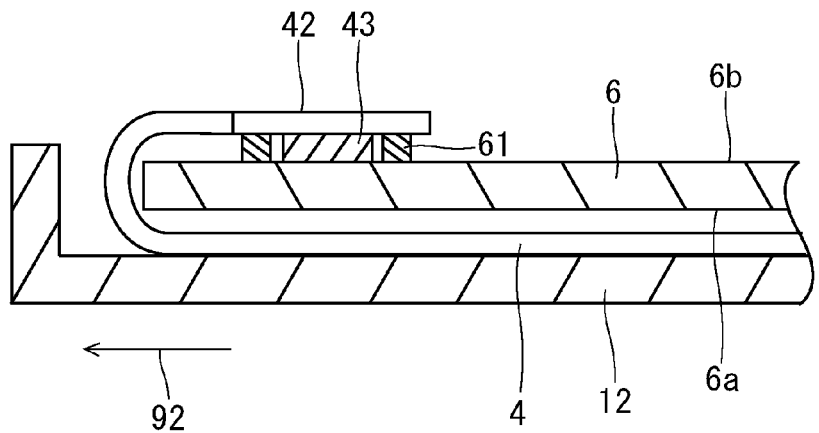
FIG. 7 is a lateral cross-sectional view illustrating a state of the wiring of the flexible lead passing through an opening provided in the first cabinet.

FIG. 7 is a lateral cross-sectional view illustrating a state of the wiring of the flexible lead (4) after passing through the opening (14). As illustrated in FIG. 7, the flexible lead (4) passed through the opening (14) extends in the lateral direction (92) of the first cabinet (1) along the front surface (6a) of a circuit board (6) (see FIG. 4) and, thereafter, is folded back from the front surface (6a) of the circuit board (6) toward the rear surface (6b) thereof at a position on a side end surface of the circuit board (6), and a tip end portion (42) of the flexible lead (4) is connected to this circuit board (6), on the rear surface (6b) of the circuit board (6).

More specifically, as illustrated in FIG. 7, a male connector (43) which is coupled to the tip end portion (42) of the flexible lead (4) is fitted to a female connector (61) installed on the rear surface (6b) of the circuit board (6), so that the flexible lead (4) is connected to the circuit board (6).

Figure 8:
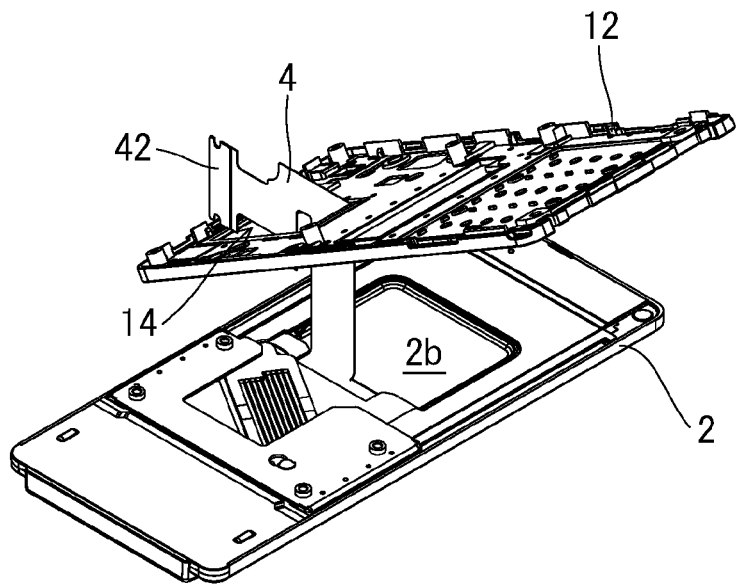
FIG. 8 is a perspective view illustrating a first stage in a first process in the assembling method.
Figure 9:
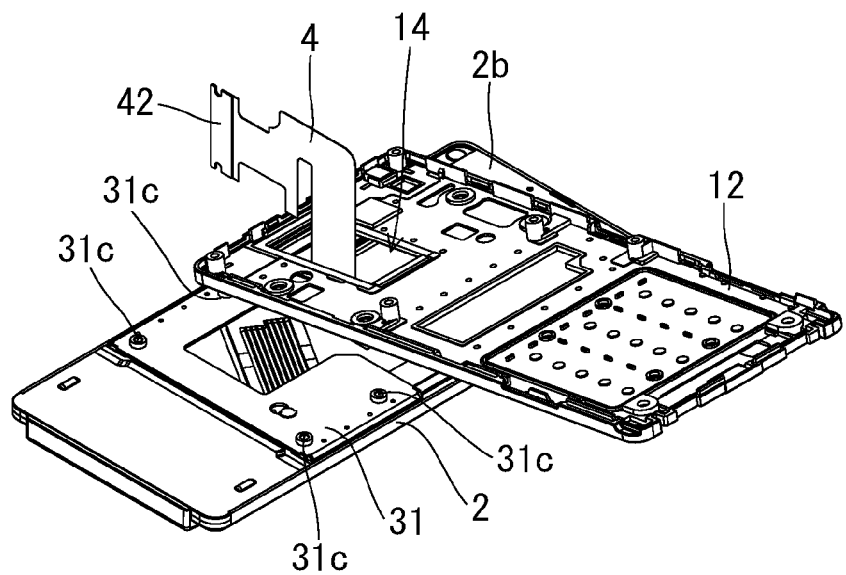
FIG. 9 is a perspective view illustrating a last stage in the first process in the assembling method.
Figure 17:
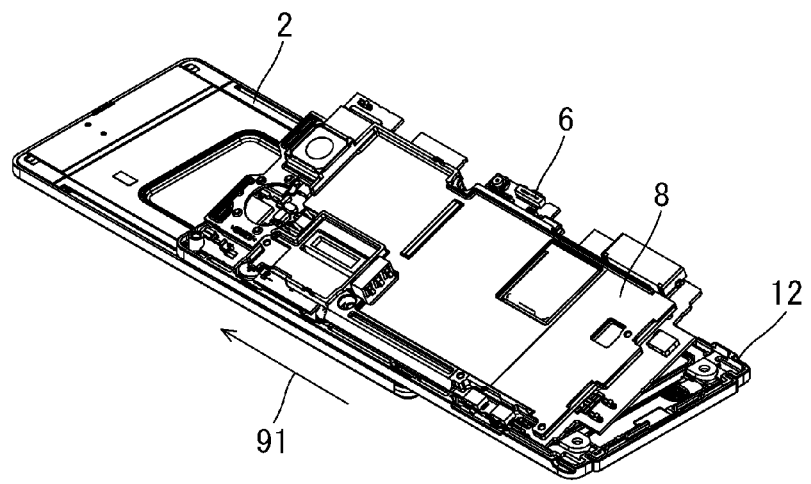
FIG. 17 is a perspective view illustrating a ninth process in the assembling method.
Figure 18:
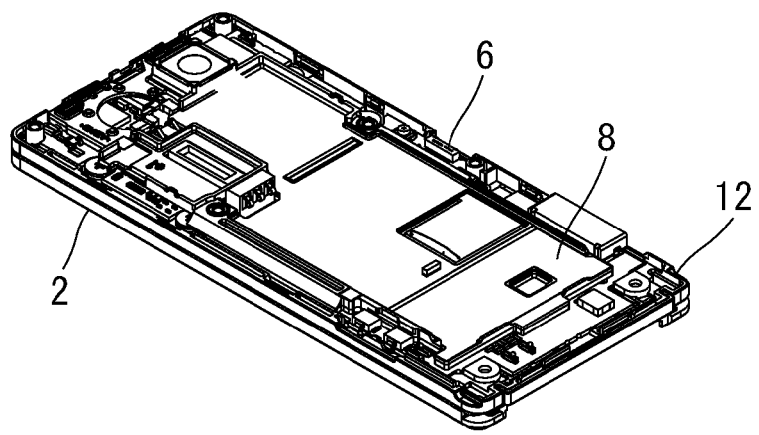
FIG. 18 is a perspective view illustrating a state where the sliding-type cellular phone has been assembled after the execution of the ninth process.

FIGS. 8 and 9 are perspective views illustrating a first stage and a last stage in a first process in a method for assembling the sliding-type cellular phone. FIGS. 10 to 15 are perspective views illustrating second to seventh processes in this assembling method. FIG. 16 is a plan view illustrating this seventh process. FIG. 17 is a perspective view illustrating a ninth process in this assembling method, and FIG. 18 illustrates a state where the sliding-type cellular phone has been assembled after the execution of the ninth process. Further, an eighth process in this assembling method is illustrated in FIG. 4.

As illustrated in FIG. 8, in the first stage in the first process in the assembling method, the front-surface case half body (12) constituting the first cabinet (1) is erected with respect to the rear surface (2b) of the second cabinet (2) and, thereafter, the flexible lead (4) which is derived through the rear surface (2b) of the second cabinet (2) and extended in a reversed-L shape is inserted, at its tip end portion (42), into the opening (14) provided in the front-surface case half body (12).

Further, as illustrated in FIG. 9, in the last stage in the first process, the flexible lead (4) is passed through the opening (14) while the front-surface case half body (12) is tipped, so that the front-surface case half body (12) is moved closer to the rear surface (2b) of the second cabinet (2).

Figure 10:
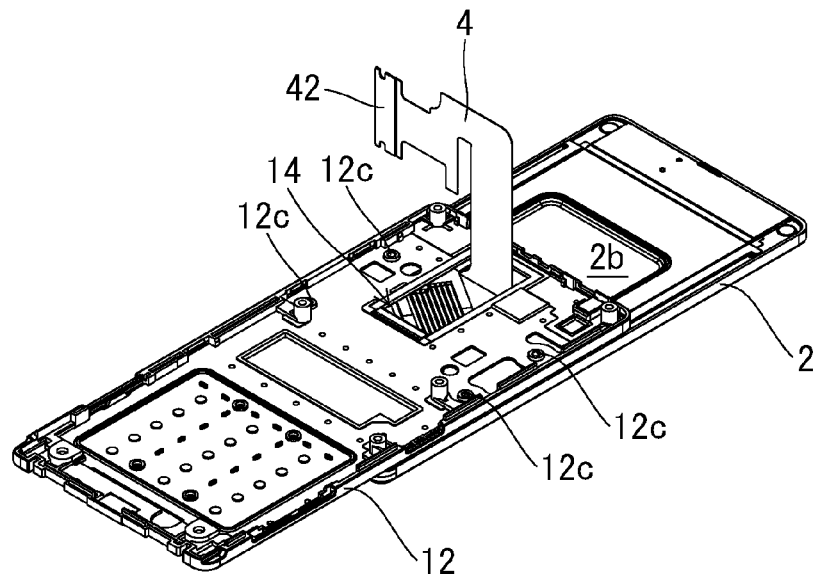
FIG. 10 is a perspective view illustrating a second process in the assembling method.

As illustrated in FIG. 10, in the second process in the assembling method, the front-surface case half body (12) is rotated about the flexible lead (4) on the rear surface (2b) of the second cabinet (2) so that the longitudinal direction of the front-surface case half body (12) is made coincident with the longitudinal direction of the second cabinet (2) and, also, four screw holes (12c) in the front-surface case main body (12) are made coincident with four screw holes (31c) in the guide portion (31), in order to enable securing the front-surface case half body (12) to the guide portion (31) (see FIG. 9) through screws.

Figure 11:
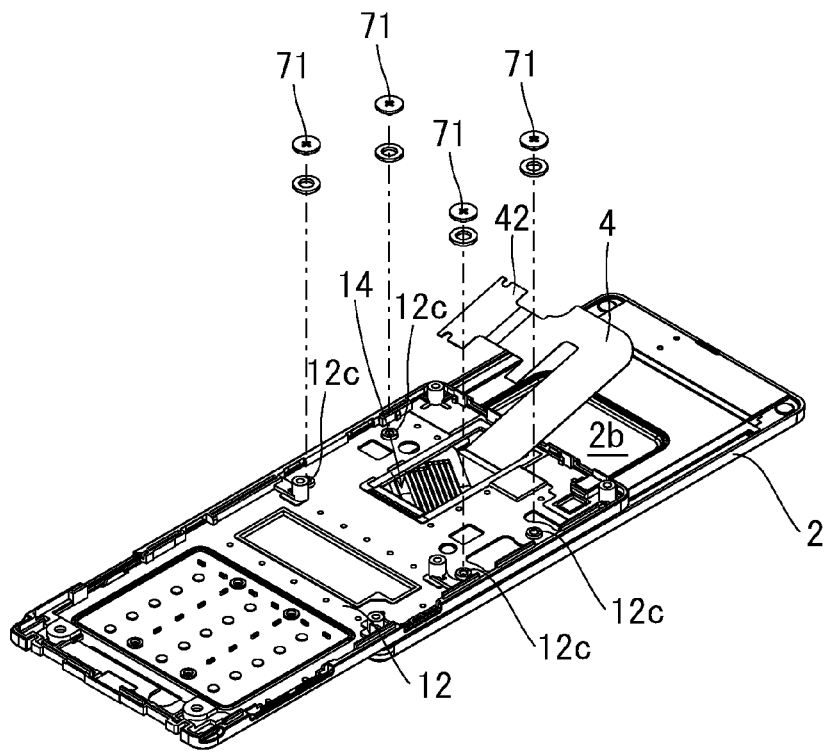
FIG. 11 is a perspective view illustrating a third process in the assembling method.

As illustrated in FIG. 11, in the third process in the assembling method, respective four screw members (71) are screwed, from the inner surface of the front-surface case main body (12), into the four screw holes (12c) in the front-surface case main body (12) and the four screw holes (31c) in the guide portion (31) which are coincident with each other, so that the front-surface case half body (12) is secured to the guide portion (31).

Figure 12:
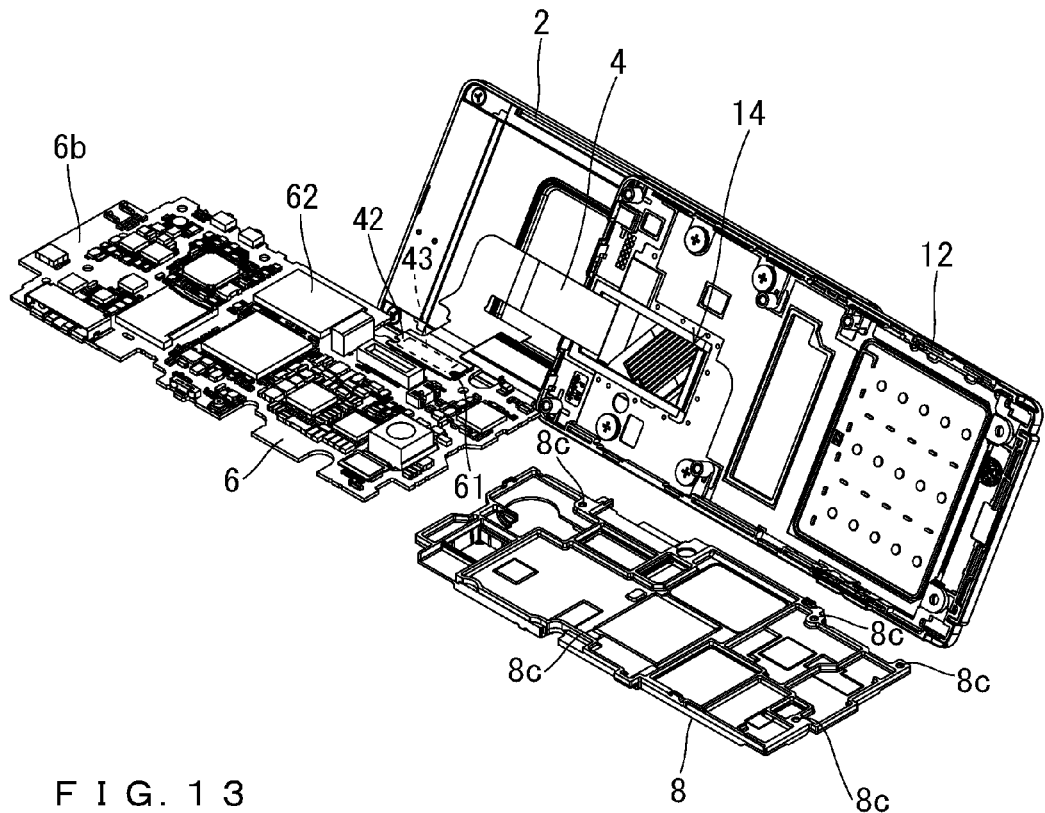
FIG. 12 is a perspective view illustrating a fourth process in the assembling method.

As illustrated in FIG. 12, in the fourth process in the assembling method, the male connector (43) coupled to the tip end portion (42) of the flexible lead (4) is connected to the female connector (61) installed on the rear surface (6b) of the circuit board (6).

Figure 13:
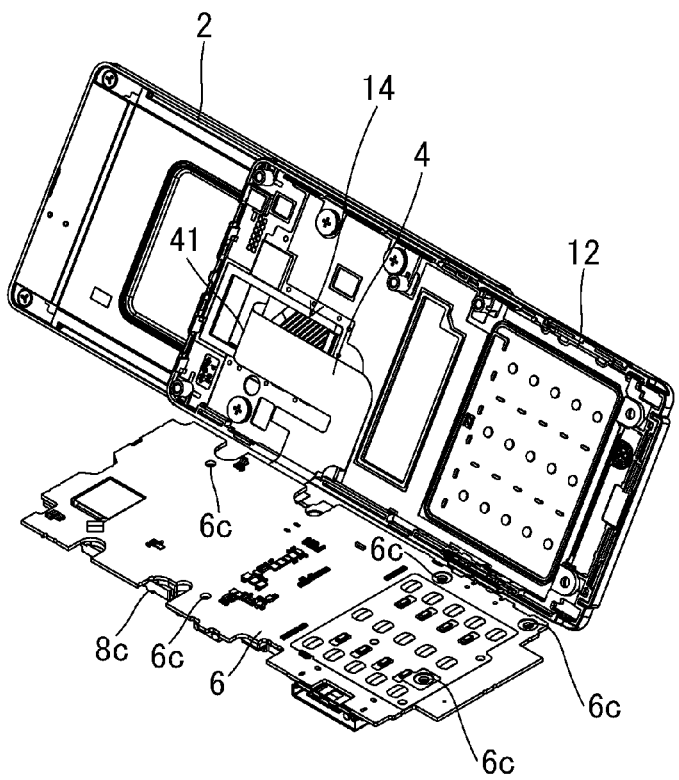
FIG. 13 is a perspective view illustrating a fifth process in the assembling method.

As illustrated in FIG. 13, in the fifth process in the assembling method, the circuit board (6), to which the flexible lead (4) is connected, is turned upside down, further, plural electric devices (62) mounted on the rear surface (6b) (see FIG. 12) of the circuit board (6) are housed within a housing member (8) and, also, five screw holes (6c) in the circuit board (6) are made coincident with five screw holes (8a) (see FIG. 12) in the housing member (8), in order to enable securing the circuit board (6) to the housing member (8) through screws.

In parallel therewith, the flexible lead (4) is folded back within the opening (14) provided in the front-surface case half body (12), thereby forming the bent portion (41) of the flexible lead (4).

Figure 14:
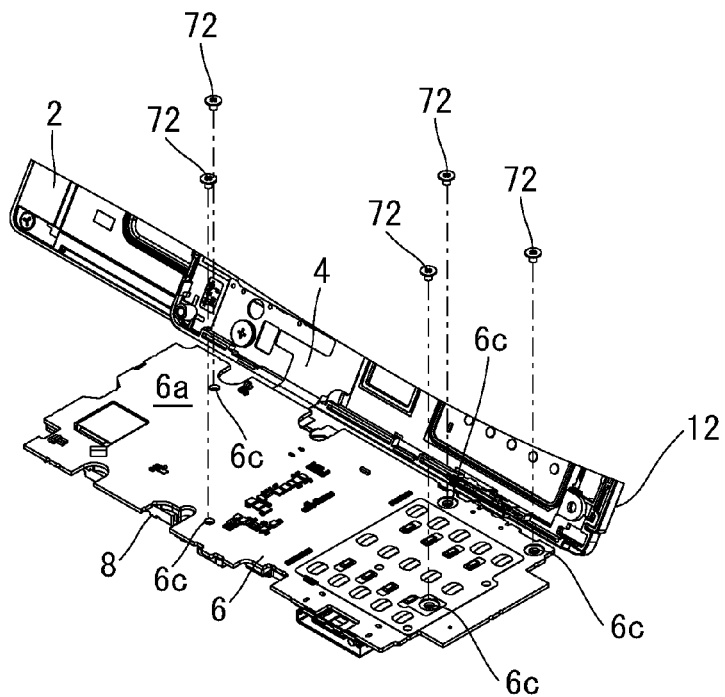
FIG. 14 is a perspective view illustrating a sixth process in the assembling method.

As illustrated in FIG. 14, in the sixth process in the assembling method, five screw members (72) are screwed, from the front surface (6a) of the circuit board (6), into the five screw holes (6c) in the circuit board (6) and the five screw holes (8a) in the housing member (8), so that the circuit board (6) is secured to the housing member (8).

Figure 15:
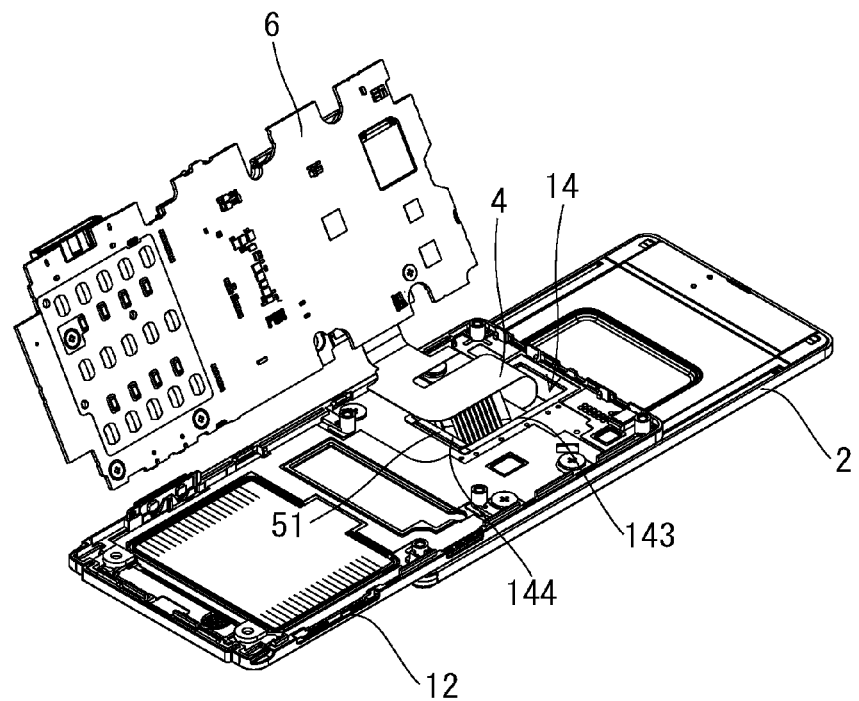
FIG. 15 is a perspective view illustrating a seventh process in the assembling method.
Figure 16:
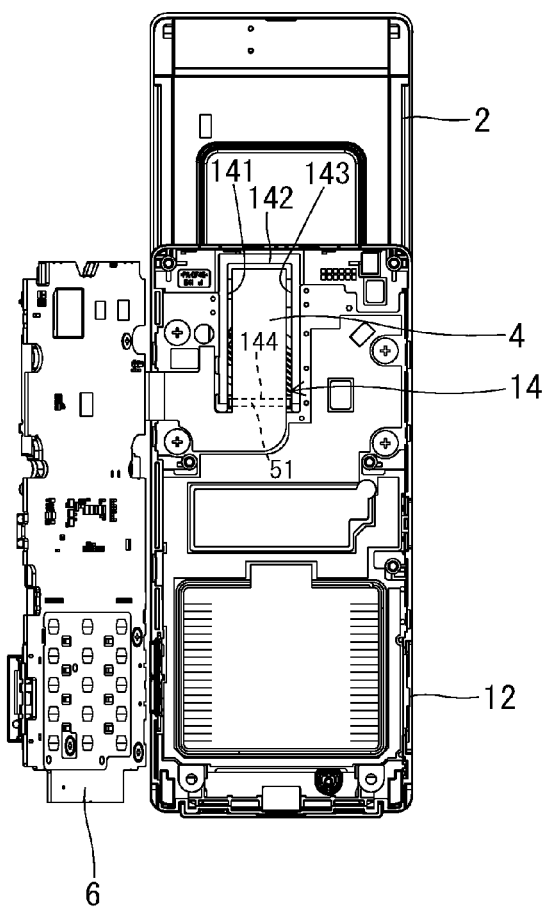
FIG. 16 is a plan view illustrating the seventh process in the assembling method.

As illustrated in FIGS. 15 and 16, in the seventh process in the assembling method, the sponge member (51) is adhered to the edge portion forming a single side (144) on which the flexible lead (4) is to be passed, out of the four sides (141) forming the edges of the opening (14) provided in the front-surface case half body (12), with the sponge member (51) taking such an attitude that the sponge member (51) is along this single side (144).

In a detailed structure of the sliding-type portable electronic apparatus, the opening has a substantially-rectangular shape formed from four sides, the waterproof sheet is adhered, at a portion of its peripheral edge portions, to edge portions forming three sides, out of the four sides, while the waterproof sheet is opposed, at a peripheral edge portion thereof, to an edge portion forming the remaining single side, the flexible lead passes between their opposing surfaces and, also, the opposing surface of the waterproof sheet is adhered to the flexible lead.

In a more-detailed structure, a sealing member is pinched between the flexible lead and the opposing surface of the edge portion forming the remaining single side or an area close thereto.

With this more-detailed structure, it is possible to prevent water from intruding between the flexible lead and the opposing surface of the edge portion forming the remaining single side, with the sealing member pinched therebetween.

In another detailed structure of the sliding-type portable electronic apparatus, the flexible lead passed through the opening extends in a lateral direction of the other casing along the front surface of the circuit board and, thereafter, is folded back from the front surface of the circuit board toward the rear surface thereof at a position on a side end surface of the circuit board.

As illustrated in FIG. 4, in the eighth process in the assembling method, the opening (14) is closed by the waterproof sheet (5) on the inner surface of the front-surface case half body (12), and the waterproof sheet (5) is adhered, at a portion of its peripheral edge portions, to the edge portions forming the three sides (141) to (143) other than the single side (144), out of the four sides (141) to (144) forming the edges of the opening (14). At this time, the waterproof sheet (5) is opposed, at a peripheral edge portion thereof, to the edge portion forming the single side (144), and the opposing surface (5a) of the waterproof sheet (5) is adhered to the flexible lead (4) (see FIG. 5).

As illustrated in FIG. 17, in the ninth process in the assembling method, in order to house, in the front-surface case half body (12), the circuit board (6) which is secured to the housing member (8), in a state where, out of the side end surfaces of the circuit board (6), the side end surface existing in the direction of deriving of the flexible lead from the female connector (61) is faced to the front-surface case half body (12), the circuit board (6) is rotated, thereby turning the circuit board (6) upside down. As a result thereof, the flexible lead (4) is folded back from the rear surface (6b) of the circuit board (6) toward the front surface (6a) thereof, at a position on the side end surface of the circuit board (6).

Accordingly, in the state where the circuit board (6) is housed in the front-surface case half body (12) as illustrated in FIG. 18, the flexible lead (4) passed through the opening (14) is extended in the lateral direction (92) of the first cabinet (1) along the front surface (6a) of the circuit board (6) and, thereafter, is folded back from the front surface (6a) of the circuit board (6) toward the rear surface (6b) thereof, at a position on the side end surface of the circuit board (6), as illustrated in FIG. 7.

As described above, according to the processing for assembling the sliding-type cellular phone, it is possible to rotate the circuit board (6), with the side end surface of the circuit board (6) faced to the front-surface case half body (12), in a state where the flexible lead (4) is kept connected to the circuit board (6). At this time, the flexible lead (4) is hardly moved at its portion extending to the side end surface of the circuit board (6) from the opening (14) provided in the front-surface case half body (12) (hereinafter, this portion will be referred to as "the derived portion"), and only the tip end portion (42) of the flexible lead (4) is rotated while changing its bending angle with respect to the derived portion.

In the sliding-type portable electronic apparatus, the flexible lead passed through the opening is folded back from the front surface of the circuit board toward the rear surface thereof at a position on the side end surface of the circuit board and, therefore, in the aforementioned assembling processing, it is possible to rotate the circuit board, with the side end surface of the circuit board faced to the one case half body, in a state where the flexible lead is kept connected to the circuit board. At this time, the flexible lead is hardly moved at its derived portion which extends from the opening to the side end surface of the circuit board, and only the tip end portion of the flexible lead is rotated while changing its bending angle with respect to the derived portion.

Accordingly, even after the flexible lead (4) has been connected to the circuit board (6), the inner surface of the front-surface case half body (12) can be exposed, as illustrated in FIG. 4. This enables adhering the waterproof sheet (5), at its peripheral edge portions, to the inner surface of the front-surface case half body (12) and to the flexible lead (4), at positions on the periphery of the opening (14), thereby closing the opening (14) by the waterproof sheet (5).

After the waterproof sheet has been adhered thereto, the circuit board is rotated as described above, so that the circuit board is housed in the one half-body case.

Since water is inhibited from intruding between the waterproof sheet (5) and the inner surface of the front-surface case half body (12) and the flexible lead (4), which are adhered to each other, the sliding-type cellular phone is capable of exerting its waterproof performance, with the waterproof sheet (5) closing the opening (14) through which the flexible lead (4) passes.

Further, in the sliding-type cellular phone, the flexible lead (4) passes between the opposing surface (5a) of the waterproof sheet (5) and the opposing surface (144a) of the edge portion of the opening (14), which are not adhered to each other. Further, the sponge member (51) is adhered to the opposing surface (144a) of the edge portion, and this sponge member (51) is pinched between the flexible lead (4) and the front-surface case half body (12). Furthermore, the opposing surface (5a) of the waterproof sheet (5) is adhered to the flexible lead (4).

Accordingly, the sliding-type cellular phone has such a structure as to further inhibit water from intruding, thereinto, between the waterproof sheet (5) and the edge portion of the opening (14) which are not adhered to each other.

With the sliding-type portable electronic apparatus according to the present invention, it is possible to exert excellent waterproof performance, with the waterproof sheet closing the opening through which the flexible lead passes.

Further, the structures of the respective components of the present invention are not limited to those in the aforementioned embodiment, and various changes can be made thereto within the technical scope defined in the claims. For example, the flexible lead (4) passed through the opening (14) provided in the first cabinet (1) can be folded back from the front surface (6a) of the circuit board (6) toward the rear surface (6b) thereof, at a position on a side end surface of the circuit board (6), after extending in the longitudinal direction (91) of the first cabinet (1) along the front surface (6a) of the circuit board (6).

Figure 19:
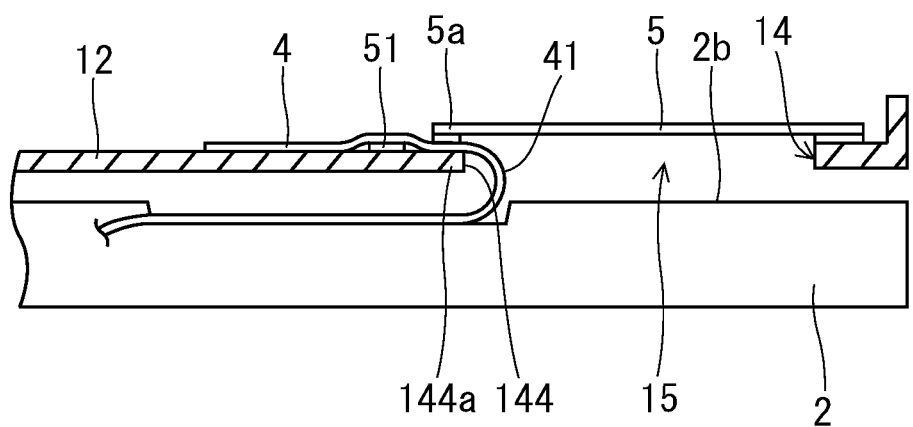
FIG. 19 is a longitudinal cross-sectional view illustrating an example of modification of the sliding-type cellular phone.

While, in the aforementioned embodiment, the sponge member (51) is provided on the opposing surface (144a) of the edge portion, the sponge member (51) can be provided in an area close to the opposing surface (144a) of the edge portion, as illustrated in FIG. 19. Further, instead of the sponge member (51), it is possible to employ various types of sealing members.

Further, various types of structures employed in the sliding-type cellular phone can be applied to various types of sliding-type portable electronic apparatuses.

DESCRIPTION OF REFERENCE CHARACTERS (1) First cabinet (the other casing)
(12) Front-surface case half body
(14) Opening
(141) to (144) Four sides
(144a) Opposing surface of an edge portion
(2) Second cabinet (one casing)
(3) Sliding mechanism
(4) Flexible lead
(42) Tip end portion
(43) Male connector
(5) Waterproof sheet
(51) Sponge member (sealing member)
(5a) Opposing surface of the waterproof sheet
(6) Circuit board
(6a) Front surface
(6b) Rear surface

The invention claimed is:

1. A sliding-type portable electronic apparatus comprising a pair of casings which are slidably coupled to each other, a flexible lead which is derived from an electric component incorporated in one of the casings, further, is passed through an opening provided in the other casing and is connected to a circuit board incorporated in this other casing, and a waterproof sheet adapted to close the opening, wherein the flexible lead passed through the opening is extended along a front surface of the circuit board and, thereafter, is folded back from the front surface of the circuit board toward a rear surface thereof at a position on a side end surface of the circuit board, the flexible lead is connected, at its tip end portion, to the circuit board, on the rear surface of the circuit board, and the waterproof sheet is adhered, at its peripheral edge portions, to the flexible lead and to an inner surface of the other casing, at positions on a periphery of the opening, wherein the flexible lead passed through the opening extends in a lateral direction of the other casing along the front surface of the circuit board and, thereafter, is folded back from the front surface of the circuit board toward the rear surface thereof at a position on the side end surface of the circuit board.

2. The sliding-type portable electronic apparatus according to claim 1, wherein the opening has a substantially-rectangular shape formed from four sides, the waterproof sheet is adhered, at a portion of its peripheral edge portions, to edge portions forming three sides, out of the four sides, while the waterproof sheet is opposed, at a peripheral edge portion thereof, to an edge portion forming the remaining single side, the flexible lead passes between their opposing surfaces and, also, the opposing surface of the waterproof sheet is adhered to the flexible lead.

3. The sliding-type portable electronic apparatus according to claim 2, wherein a sealing member is pinched between the flexible lead and the opposing surface of the edge portion forming the remaining single side or an area close thereto.

4. A sliding-type portable electronic apparatus comprising:
a first casing;
a second casing slidably coupled to the first casing, wherein the second casing comprises an opening;
a circuit board within the second casing, wherein the circuit board comprises a front surface and a rear surface that is opposite the front surface, and wherein the front surface of the circuit board faces an inner surface of the second casing having the opening;
a flexible lead that
  extends from the first casing,
  passes through the opening in the second casing,
  extends along the front surface of the circuit board,
  folds around an edge of the circuit board to the rear surface of the circuit board, and
  connects to the rear surface of the circuit board; and
a waterproof sheet covering the opening, wherein the waterproof sheet comprises one or more edges adhered to a portion of the flexible lead and to one or more portions of the inner surface of the second casing on a periphery of the opening.

5. The sliding-type portable electronic apparatus according to claim 4, wherein the opening comprises four sides, wherein the waterproof sheet is adhered to the portion of the flexible lead at one side of the opening, such that the flexible lead passes between the waterproof sheet and a first portion of the inner surface of the second casing, and wherein the waterproof sheet is adhered to second, third, and fourth portions of the inner surface of the second casing at the other three sides of the opening.

6. The sliding-type portable electronic apparatus according to claim 5, further comprising a sealing member between the flexible lead and the first portion of the inner surface of the second casing.

7. The sliding-type portable electronic apparatus according to claim 6, wherein the sealing member comprises a sponge.

8. The sliding-type portable electronic apparatus according to claim 4, wherein the flexible lead extends along the front surface of the circuit board in a longitudinal direction and folds around a lateral edge of the circuit board to the rear surface of the circuit board.

9. The sliding-type portable electronic apparatus according to claim 4, wherein the flexible lead forms a U-shaped bent portion within a space between the first casing and the second casing.

* * * * *